United States Patent

[11] 3,563,348

| [72] | Inventor | Barry L. Frost<br>Jackson, Mich. |
|---|---|---|
| [21] | Appl. No. | 820,399 |
| [22] | Filed | Apr. 30, 1969 |
| [45] | Patented | Feb. 16, 1971 |
| [73] | Assignee | Clark Equipment Company<br>a corporation of Delaware |

[54] INTERNALLY EXPANDING BRAKE WITH PILOT MECHANISM
2 Claims 6 Drawing Figs.

[52] U.S. Cl. .................................................. 188/78;
192/35
[51] Int. Cl. .................................................. F16d 51/70
[50] Field of Search .......................................... 188/78.2,
78.26, 78.33, 78B, 152.82; 192/35, 36

[56] References Cited
UNITED STATES PATENTS

| 1,693,887 | 12/1928 | Christensen | 188/78(.33)X |
| 1,989,740 | 2/1935 | Clizbe | 188/78(.2)X |
| 2,233,877 | 3/1941 | Smith | 188/78(.2) |

FOREIGN PATENTS

| 525,328 | 8/1940 | Great Britain | 188/78 |

*Primary Examiner*—George E. A. Halvosa
*Attorneys*—Kenneth C. Witt, John C. Wiessler, Robert H. Johnson and Reginald J. Falkowski

ABSTRACT: An internal expanding shoe brake having an energizer shoe movable radially and circumferentially. Circumferential movement of the energizer shoe rotates an actuator ring which causes radial and circumferential movement of two main brake shoes, thereby applying the brake.

Patented Feb. 16, 1971

INVENTOR
BARRY L. FROST
BY Robert Johnson
ATTORNEY

Patented Feb. 16, 1971

INVENTOR
BARRY L. FROST
BY Robert H. Johnson
ATTORNEY

Patented Feb. 16, 1971

INVENTOR
BARRY L. FROST
BY Robert H. Johnson
ATTORNEY

INTERNALLY EXPANDING BRAKE WITH PILOT MECHANISM

BACKGROUND OF THE INVENTION

The field of art to which this invention relates includes operators for internal expanding shoe brakes.

A principal object of my invention is to provide a reversible brake with increased capacity and equal capacity in both directions.

Summary of the Invention

In carrying out my invention in a preferred embodiment, I provide a support plate having a pair of guide and anchor means and an actuator. Carried by each guide and anchor means is a main brakeshoe which is movable radially and circumferentially. An energizer brakeshoe is carried by mechanism operated by the actuator to move the energizer shoe radially. The energizer shoe also is movable circumferentially and when moved circumferentially serves to rotate an actuator ring which in turn causes a pair of main brake shoes to move radially and circumferentially.

The above and other objects, features and advantages of my invention will be more readily understood by persons skilled in the art when the detailed description is taken in conjunction with the drawing.

DESCRIPTION OF THE PREFERRED EMBODIMENT

Figure 2:
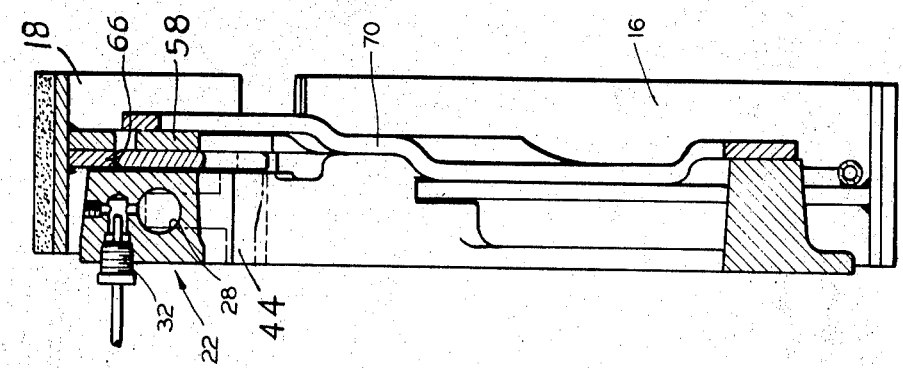
FIG. 2 is a cross section taken along line 2—2 of FIG. 1.

Referring now to the drawing, the reference numeral 10 denotes generally an internal expanding shoe-type brake which includes a drum 12 inwardly of which are disposed two main brakeshoes 14 and 16 and an energizer brakeshoe 18, all of which are carried by a support plate 20.

Figure 5:
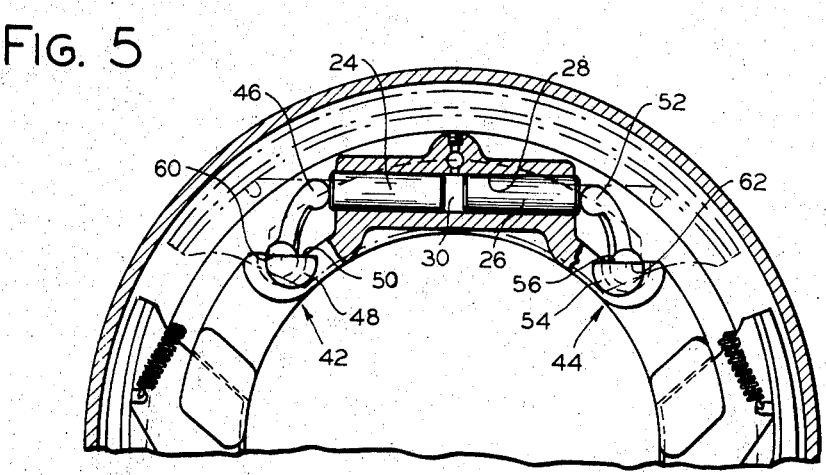
FIG. 5 is a fragmentary view similar to FIG. 3 with the energizer brakeshoe shown in phantom outline and with the actuator shown in section.
Figure 6:
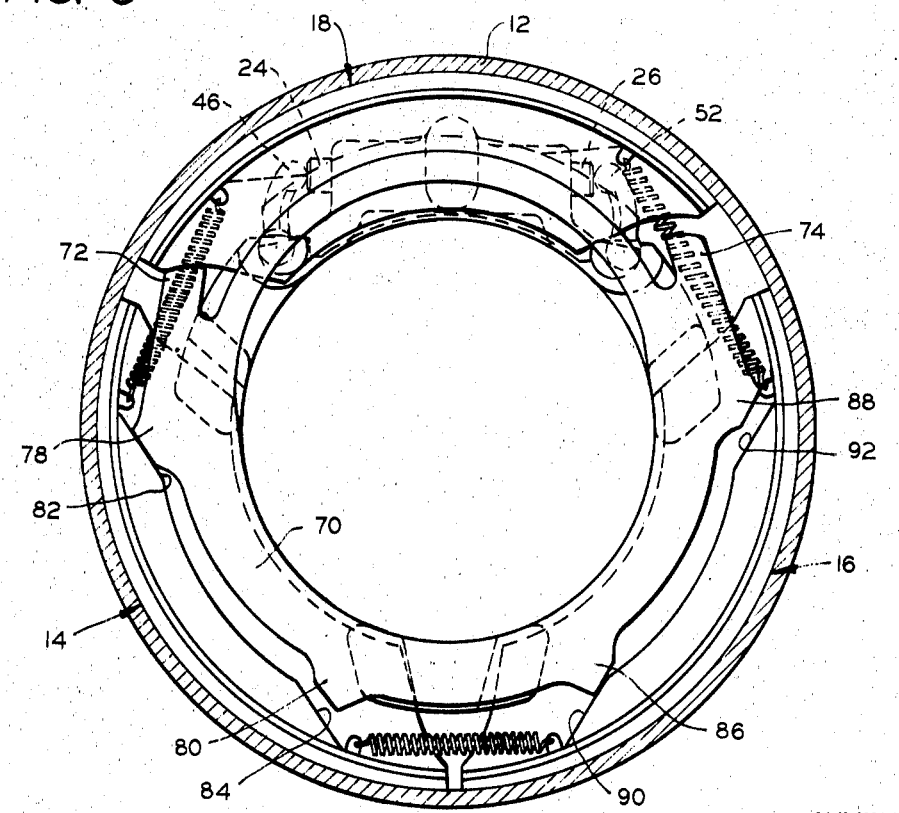
FIG. 6 is similar to FIG. 1, but on a reduced scale and with the brake engaged.

Support plate 20 has integral therewith an actuator 22 which includes a pair of opposed pistons 24 and 26 (FIG. 5) slidably disposed in a cylinder 28. Pistons 24 and 26 define with cylinder 28 a fluid chamber 30 which is adapted to be supplied with pressurized brake fluid through a port 32.

Support plate 20 also includes a first pair of slots 34 and 36 which serve as a guide and anchor for brakeshoe 14 and a second pair of slots 38 and 40 which serve as a guide and anchor for brakeshoe 16.

Disposed adjacent opposite ends of actuator 22 is a pair of bellcranks 42 and 44 which are pivotally connected to support plate 20. Bellcrank 42 includes an arm 46 which engages the outer end of piston 24 and an arm 48 with a surface 50 which is generally horizontal, as viewed in FIG. 1. Similarly, bellcrank 44 includes an arm 52 which engages the outer end of piston 28 and an arm 54 with a surface 56 which is generally horizontal, as viewed in FIG. 1.

Carried by bellcranks 42 and 44 is an energizer plate 58 which includes a pair of generally flat surfaces 60 and 62 that engage surfaces 50 and 56, respectively. Energizer plate 58 also includes an arcuate surface 64.

Energizer brakeshoe 18 includes an arcuate surface 66 which is complimentary to and engages arcuate surface 64 so that energizer brakeshoe 18 is supported from plate 58. Further, it will be apparent at this point that by supplying chamber 30 with pressurized brake fluid that pistons 24 and 26 are forced outwardly with the result that bellcranks 42 and 44 are pivoted so that arms 48 and 54 cause energizer plate 58 to move radially outwardly (upwardly in FIG. 1). Radially outwardly movement of plate 58 causes energizer brake shoe 18 to move radially outwardly into contact with drum 12. Assuming that drum 12 is rotating counterclockwise, as indicated by arrow 68, energizer brakeshoe 18 will shift circumferentially counterclockwise also.

Overlaying brakeshoes 14, 16 and 18 is an actuator ring 70 which includes a pair of tangs 72 and 74 that engage opposite ends of the web portion 76 of energizer brakeshoe 18. Ring 70 includes a pair of projections 78 and 80 which engage a pair of inclined surfaces 82 and 84, respectively, which form a portion of main brakeshoe 14. Further, ring 70 includes a pair of projections 86 and 88 which engage a pair of inclined surfaces 90 and 92, respectively, that form a portion of main brake shoe 16.

It will now be apparent that rotational movement of ring 70 in either direction will, through the cooperation of the various projections and inclined surfaces, cause main brakeshoes 14 and 16 to move radially outwardly into engagement with drum 12, and at the same time move slightly circumferentially in the direction of rotation of drum 12 so that one end of the web portion of the main brakeshoes is already in abutment with one of the slots which serve as anchors so that there will not be any reaction shock imposed on the brake due to the main brakeshoes shifting over into engagement with the slots which serve as anchors.

The brakeshoes are held in their disengaged position by means of a tension spring 94 connected between shoes 14 and 18, a tension spring 96 connected between shoes 14 and 16 and a tension spring 98 connected between shoes 16 and 18.

Figure 1:
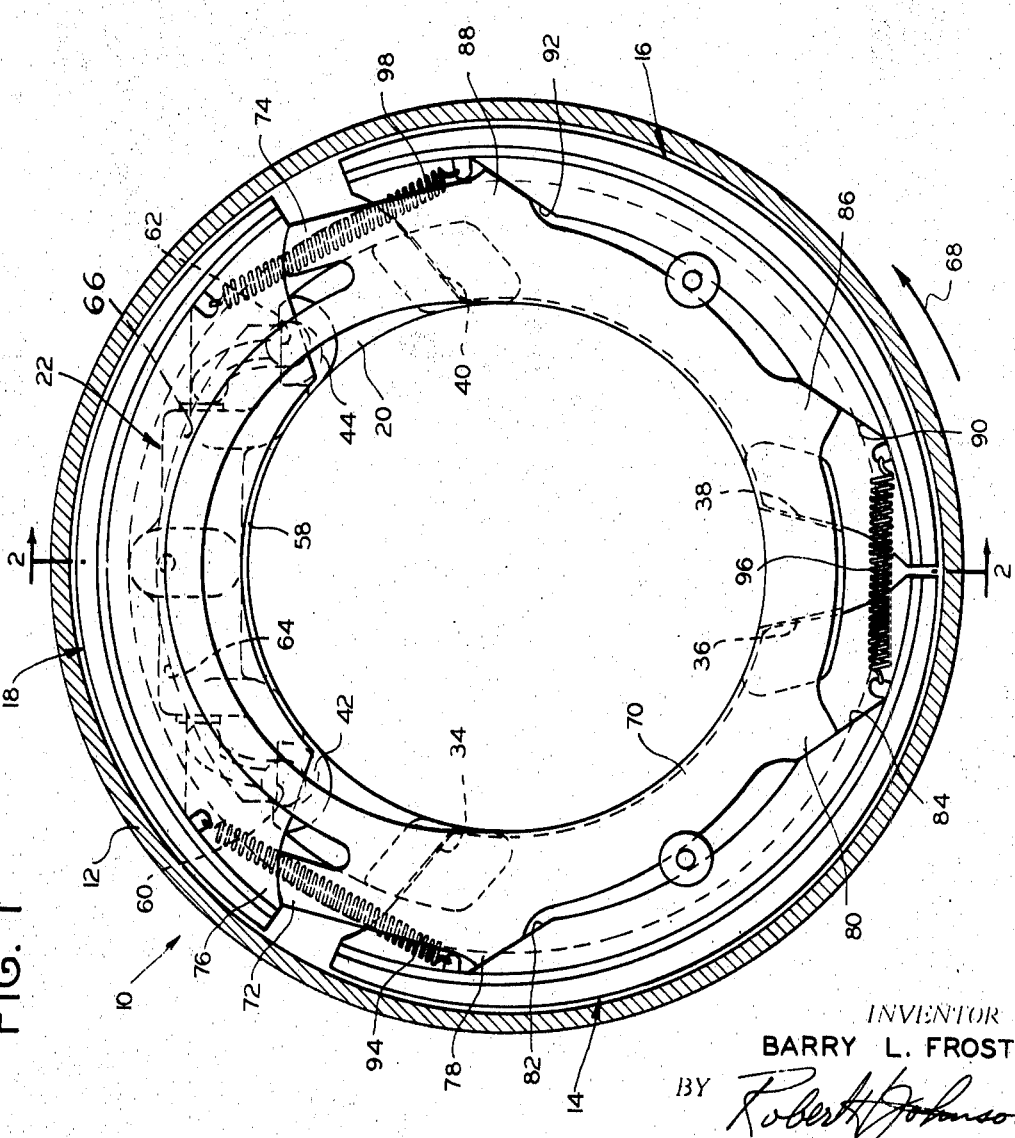
FIG. 1 is an elevational view of a brake embodying my invention.
Figures 3, 4:
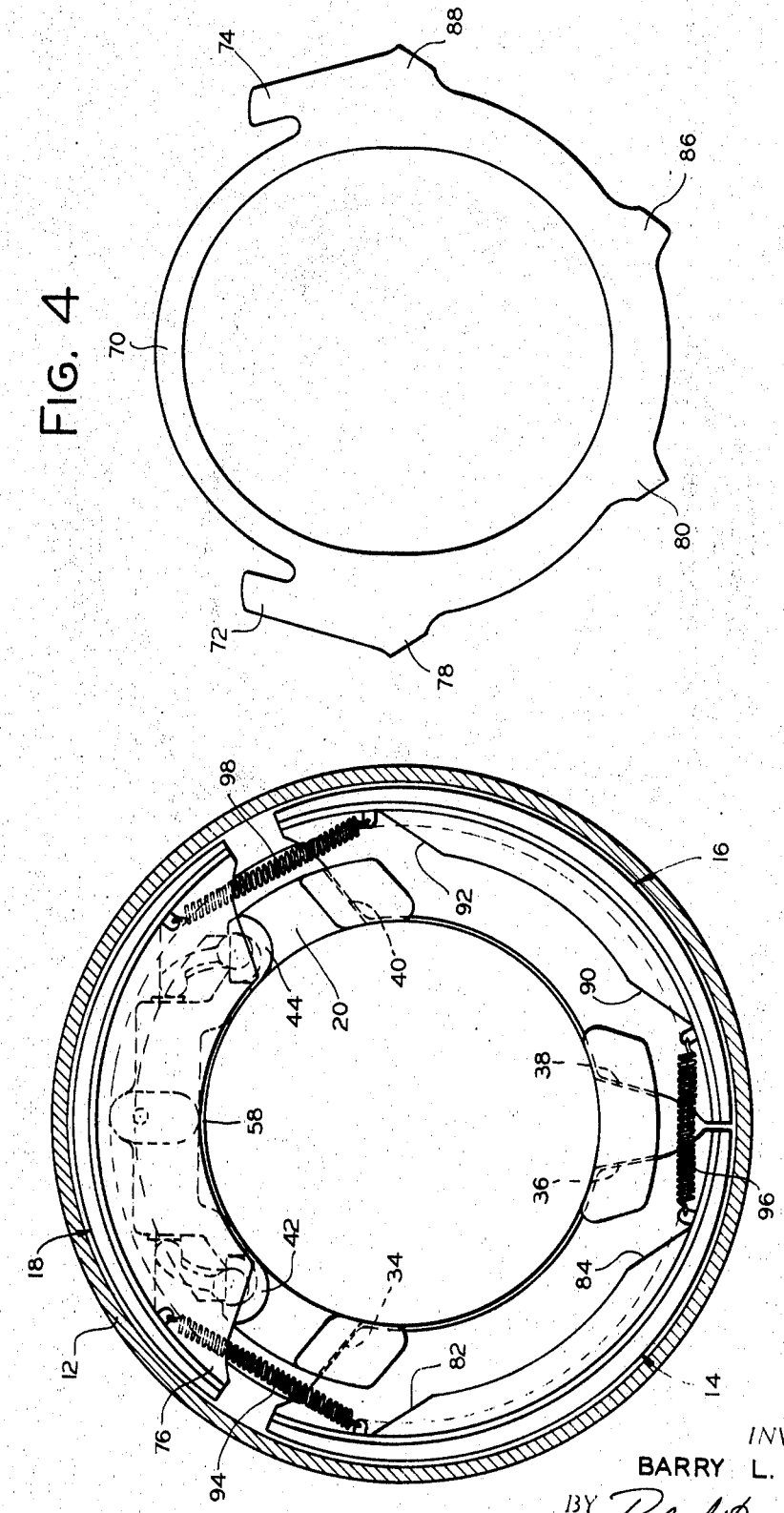
FIG. 3 is a view similar to FIG. 1, but on a reduced scale and with the actuator ring removed.
FIG. 4 shows the actuator ring alone.

In order to enable persons skilled in the art to better understand my invention, I will now explain the operation of it. It will be assumed that the brake is in the disengaged condition as shown in FIG. 1, and that brakedrum 12 is rotating in a counterclockwise direction, as indicated by arrow 68. In order to apply the brake the operator will supply pressurized brake fluid through port 32 to chamber 30 with the result that pistons 24 and 26 will be forced away from each other so that bell cranks 42 and 44 will be pivoted about their axes, thereby causing energizer plate 58 to move radially outwardly, and thus bring energizer shoe 18 into engagement with drum 12. When shoe 18 engages drum 12 it will be shifted circumferentially in a counterclockwise direction against reaction strut 72, causing actuator ring 70 to rotate in a counterclockwise direction also. As a result of the counterclockwise rotation of actuator ring 70 an outwardly directed force will be transmitted to brakeshoe 14 through the cooperation of projection 78 and inclined surface 82. At the same time an outwardly directed force will be transmitted to brakeshoe 16 through the cooperation of projection 86 and inclined surface 90. Consequently, brakeshoes 14 and 16 will move radially outwardly and circumferentially into engagement with brakedrum 12. When pressurized fluid is removed from chamber 30 tension springs 94, 96 and 98 will return the brake mechanism, including the brakeshoes to the position shown in FIG. 1. The brake works in exactly the same manner for the opposite direction of rotation of drum 12, and so this operation need not be further described, except that the action of the brake disengages and reengages when pressure is applied and the drive reverses therefore leaving all reaction surfaces in contact and eliminating the reaction shock normally encountered in servo brakes.

While only a single embodiment of my invention has been described hereinabove, it will be understood that this description is intended to be illustrative only and that various modifications and changes can be made to my invention without departing from the spirit and scope of it.

I claim:

1. A brake assembly comprising a support plate having first and second shoe guide and anchor means, a first brakeshoe disposed in said first guide and anchor means for radial and circumferential movement, a second brakeshoe disposed in said second guide and anchor means for radial and circumferential movement, a third brakeshoe having an arcuate surface, an actuator connected to said support plate, said actuator including a cylinder and a pair of opposed pistons slidably disposed in said cylinder, mechanism operated by said actuator to support and move said third shoe radially and permit circumferential movement of it, said mechanism including a pair of bellcranks pivotally connected to said support plate, each bellcrank having a first arm engaging one of said pistons and a second arm, and an energizer plate carried by said second arms and movable radially outwardly upon operation of said actuator, said energizer plate having a second arcuate surface which is complimentary to and engages said first arcuate surface, and an actuator ring disposed to engage said first, second and third shoes so that upon circumferential movement of said third shoe said ring will rotate and cause said first and second shoes to move radially outwardly and circumferentially.

2. A brake assembly as set forth in claim 1 and including tension means connected between the said first and third shoes, the said first and second shoes and the said second and third shoes.